United States Patent
Benisty

(10) Patent No.: US 10,642,500 B2
(45) Date of Patent: May 5, 2020

(54) METHODS, SYSTEMS AND COMPUTER READABLE MEDIA FOR INTELLIGENT FETCHING OF DATA STORAGE DEVICE COMMANDS FROM SUBMISSION QUEUES

(71) Applicant: SanDisk Technologies LLC, Plano, TX (US)

(72) Inventor: Shay Benisty, Beer Sheva (IL)

(73) Assignee: SANDISK TECHNOLOGIES LLC, Plano, TX (US)

( * ) Notice: Subject to any disclaimer, the term of this patent is extended or adjusted under 35 U.S.C. 154(b) by 176 days.

(21) Appl. No.: 15/908,710

(22) Filed: Feb. 28, 2018

(65) Prior Publication Data

US 2018/0188975 A1 Jul. 5, 2018

Related U.S. Application Data

(63) Continuation-in-part of application No. 14/868,373, filed on Sep. 28, 2015, now Pat. No. 9,927,983.

(51) Int. Cl.
*G06F 3/06* (2006.01)
*G06N 20/00* (2019.01)

(52) U.S. Cl.
CPC .......... *G06F 3/0611* (2013.01); *G06F 3/0659* (2013.01); *G06F 3/0679* (2013.01); *G06N 20/00* (2019.01)

(58) Field of Classification Search
CPC .......... G06F 12/00; G06F 3/06; G06F 3/0611; G06F 13/00
USPC .................................. 711/100, 103, 154, 200
See application file for complete search history.

(56) References Cited

U.S. PATENT DOCUMENTS

| | | | | |
|---|---|---|---|---|
| 5,948,081 A | * | 9/1999 | Foster ................. | G06F 13/1642 710/25 |
| 2002/0062414 A1 | | 5/2002 | Hofmann et al. | |
| 2009/0300320 A1 | * | 12/2009 | Zhang ................ | G06F 12/0862 711/213 |
| 2013/0086311 A1 | | 4/2013 | Huang et al. | |
| 2013/0326113 A1 | * | 12/2013 | Wakrat ............... | G06F 12/0868 711/103 |
| 2014/0129749 A1 | * | 5/2014 | Bass .................. | G06F 13/1663 710/111 |
| 2014/0359245 A1 | * | 12/2014 | Jones ................... | G06F 12/023 711/170 |

OTHER PUBLICATIONS

"NVM Express," Specification Revision 1.2, http://nvmexpress.org/wp-content-uploads-NVM_Express_1_2_Gold_20141209.pdf, pp. 1-205 (Nov. 3, 2014).

* cited by examiner

*Primary Examiner* — Tuan V Thai
(74) *Attorney, Agent, or Firm* — Loza & Loza, LLP; Gabriel Fitch

(57) ABSTRACT

Systems and methods for intelligent fetching of data storage device commands from submission queues are provided. One such method involves fetching commands from one or more submission queues, monitoring characteristics of the commands including a command type, predicting a next command based on the monitored command characteristics, monitoring a resource state of a data storage device, selecting a submission queue based on the predicted next command and the resource state, fetching a command from the selected submission queue, and providing the command from the selected submission queue to command processing logic.

31 Claims, 11 Drawing Sheets

| SQ NUMBER | # PENDING COMMANDS | # FETCHED COMMANDS | # FETCHED READ COMMANDS | READ:WRITE RATIO | AVERAGE SIZE | SMALLEST SIZE | BIGGEST SIZE |
|---|---|---|---|---|---|---|---|
| 0 | | | | | | | |
| 1 | | | | | | | |
| N | | | | | | | |

FIG. 5

| BIT | DESCRIPTION |
|---|---|
| 31:16 | COMMAND IDENTIFIER (CID): THIS FIELD SPECIFIES A UNIQUE IDENTIFIER FOR THE COMMAND WHEN COMBINED WITH A SUBMISSION QUEUE IDENTIFIER |
| 15:14 | PRP OR SGL DATA TRANSFER (PSDT): THIS FIELD SPECIFIES WHETHER PRPs OR SGLs ARE USED FOR ANY DATA TRANSFER ASSOCIATED WITH THE COMMAND. PRPs SHALL BE USED FOR ALL ADMIN COMMANDS. THE DEFINITION IS DESCRIBED IN THE TABLE BELOW.<br><br>| VALUE | DEFINITION |<br>\|---\|---\|<br>\| 00b \| PRPs ARE USED FOR THIS TRANSFER \|<br>\| 01b \| SGLs ARE USED FOR THIS TRANSFER \|<br>\| 10b \| SGLs ARE USED FOR THIS TRANSFER \|<br>\| 11b \| RESERVED \|<br><br>IF THERE IS METADATA THAT IS NOT INTERLEAVED WITH THE LOGICAL BLOCK DATA, AS SPECIFIED IN THE FORMAT NVM COMMAND, THEN THE METADATA POINTER (MPTR) FIELD IS USED TO POINT TO THE METADATA. THE DEFINITION OF THE METADATA POINTER FIELD IS DEPENDENT ON THE SETTING IN THIS FIELD. |
| 13:10 | RESERVED |
| 09:08 | FUSED OPERATION (FUSE): IN A FUSED OPERATION, A COMPLEX COMMAND IS CREATED BY "FUSING" TOGETHER TWO SIMPLER COMMANDS. REFER TO SECTION 6.1. THIS FIELD SPECIFIES WHETHER THIS COMMAND IS PART OF A FUSED OPERATION AND IF SO, WHICH COMMAND IT IS IN THE SEQUENCE.<br><br>| VALUE | DEFINITION |<br>\|---\|---\|<br>\| 00b \| PRPs ARE USED FOR THIS TRANSFER \|<br>\| 01b \| SGLs ARE USED FOR THIS TRANSFER \|<br>\| 10b \| SGLs ARE USED FOR THIS TRANSFER \|<br>\| 11b \| RESERVED \| |
| 07:00 | OPCODE (OPC): THIS FIELD SPECIFIES THE OPCODE OF THE COMMAND TO BE EXECUTED. |

FIG. 6

METHODS, SYSTEMS AND COMPUTER READABLE MEDIA FOR INTELLIGENT FETCHING OF DATA STORAGE DEVICE COMMANDS FROM SUBMISSION QUEUES

CROSS-REFERENCE TO RELATED APPLICATION(S)

This application is a continuation in part of U.S. patent application Ser. No. 14/868,373, filed on Sep. 28, 2015, and entitled, "METHODS, SYSTEMS AND COMPUTER READABLE MEDIA FOR INTELLIGENT FETCHING OF DATA STORAGE DEVICE COMMANDS FROM SUBMISSION QUEUES", the entire content of which is incorporated herein by reference.

TECHNICAL FIELD

The subject matter described herein relates to storage devices, such as nonvolatile memory devices. More particularly, the subject matter described herein relates to intelligent fetching of data storage device commands from host-side submission queues by a nonvolatile storage device.

BACKGROUND

In the nonvolatile memory express (NVMe) system, a host device writes data storage device commands, such as read commands, write commands, and administrative commands, in submission queues, which are implemented in host memory. The nonvolatile storage device fetches the commands from the submission queues, executes the commands, and places entries in completion queues, which are also implemented in host memory, to notify the host of completion of the commands. There are typically multiple submission queues allocated by the host. Accordingly, the device controller must select from which submission queue to select the next command to be processed.

The NVMe standard, the current version of which is NVM Express, Revision 1.3, May 1, 2017, the disclosure of which is incorporated herein by reference in its entirety, describes two mechanisms by which a device controller may select commands from submission queues. One mechanism is a round robin mechanism, in which the device controller selects commands from the submission queues in round robin order. Another mechanism is a weighted round robin mechanism where the submission queues are assigned static priorities or weights, and commands are selected from submission queues in round robin order using weights to determine the selection order in each round.

In either case, the next command to be fetched from a submission queue is based on static arbitration logic that either implements no priorities, as in the round robin case, or that implements only static, host-defined priorities, as in the weighted round robin case. Such static arbitration logic may be sufficient if the storage device has sufficient resources to handle all host I/O requests. However, because storage device resources may be limited and host demands on those resources may exceed the device's ability to promptly process host commands, it may be desirable to select commands to improve utilization of storage device resources.

Accordingly, there exists a need for methods, systems, and computer readable media for intelligent fetching of storage device commands from submission queues.

SUMMARY

In one aspect, this disclosure relates to a method for use by a data storage controller, including fetching commands from one or more submission queues, monitoring characteristics of the commands including a command type, predicting a next command based on the monitored command characteristics, monitoring a resource state of a data storage device, selecting a submission queue based on the predicted next command and the resource state, fetching a command from the selected submission queue, and providing the command from the selected submission queue to command processing logic.

In another aspect, this disclosure relates to a data storage controller for use with a data storage device, including: a memory, a processing circuitry coupled to the memory and configured to fetch commands from one or more submission queues, monitor characteristics of the commands including a command type, predict a next command based on the monitored command characteristics, monitor a resource state of a data storage device, select a submission queue based on the predicted next command and the resource state, fetch a command from the selected submission queue, and provide the command from the selected submission queue to command processing logic.

In yet another aspect, this disclosure relates to a data storage controller for use with a data storage device, including means for fetching commands from one or more submission queues, means for monitoring characteristics of the commands including a command type, means for predicting a next command based on the monitored command characteristics, means for monitoring a resource state of a data storage device, means for selecting a submission queue based on the predicted next command and the resource state, means for fetching a command from the selected submission queue, and means for providing the command from the selected submission queue to command processing logic.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings.

FIG. 5 is a table illustrating exemplary statistics that may be collected and used for intelligent submission queue command fetching according to an embodiment of the subject matter described herein.

FIG. 6 is a diagram illustrating an exemplary structure for an NVMe command.

DETAILED DESCRIPTION

Figure 1:
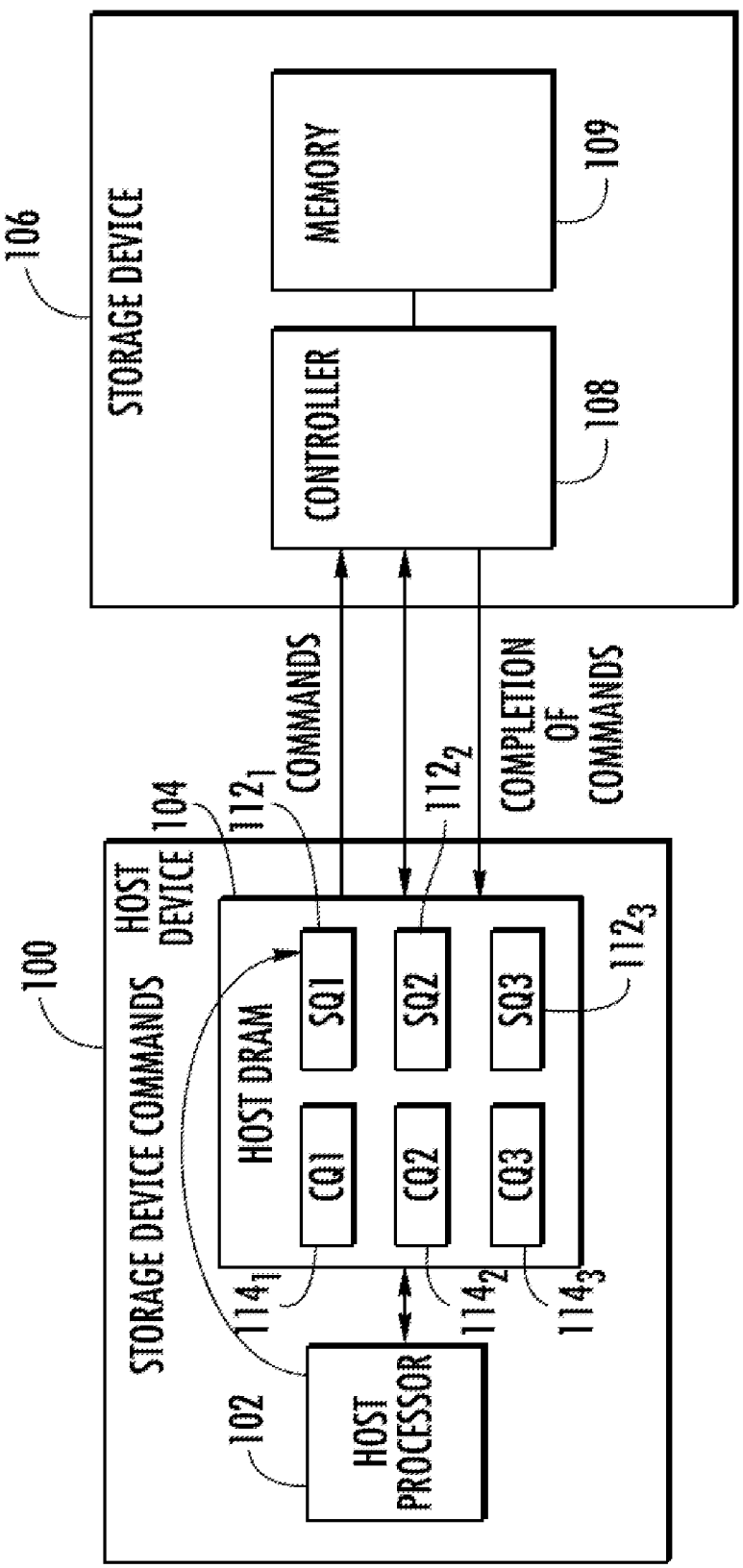
FIG. 1 is a block diagram illustrating a host device and a nonvolatile storage device according to the NVMe architecture.

As stated above, according to the NVMe standard, a host device communicates memory device commands, such as read commands, write commands, and admin commands, to a nonvolatile storage device using submission queues. FIG. 1 illustrates the NVMe architecture in which the subject matter described herein for intelligent submission queue command fetching may be implemented. In FIG. 1, host device 100 may be any suitable computing platform that is capable of accessing memory on a storage device. For example, host device 100 may be a desktop personal computer, a laptop computer, a tablet computer, a mobile telephone, or a front end to a storage array. Host device 100 includes a processor 102 and memory 104, which in the illustrated example is DRAM. Host device 100 may store data in nonvolatile storage device 106. Nonvolatile storage device 106 may be any suitable device that provides nonvolatile memory storage for host device 100. Nonvolatile storage device 106 may be a removable storage device, such as a solid state drive (SSD) that is removably connectable to host device 100. In an alternate example, nonvolatile storage device 106 may be non-removable or integrated within host device 100.

Nonvolatile storage device 106 includes a device controller 108 and nonvolatile memory 109. Device controller 108 controls access to nonvolatile memory 109. In one embodiment, device controller 108 may be a nonvolatile memory controller that implements or supports the NVMe protocol, and nonvolatile memory 109 may be 2D or 3D NAND flash memory.

In order for host device 100 to read data from or write data to nonvolatile storage device 106, host processor 102 creates and writes commands in submission queues $112_1$, $112_2$, and $112_3$. Three submission queues are shown for illustrative purposes. It is understood that there may be more or fewer than three submission queues at any given time depending on NVMe device usage by the host system. Device controller 108 fetches the commands from submission queues $112_1$, $112_2$, and $112_3$ and executes the commands Upon completion of the commands, device controller 108 writes completion entries to completion queues $114_1$, $114_2$, and $114_3$.

Figure 2:
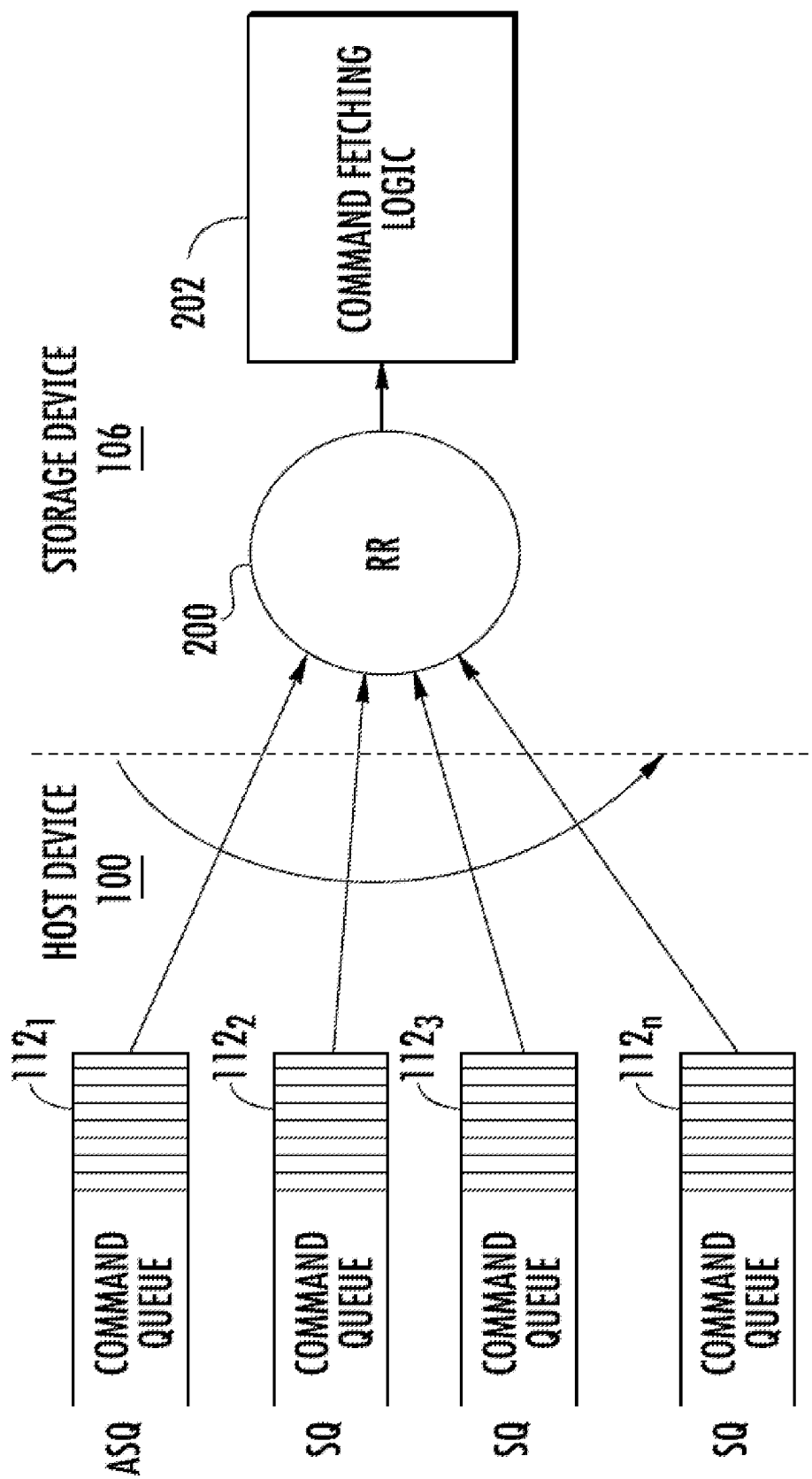
FIG. 2 is a block diagram illustrating round robin command fetching according to the NVMe standard.

As set forth above, one mechanism by which device controller 108 may select or fetch commands from submission queues from $112_1$, $112_2$, and $112_3$ is round robin selection. This mechanism is illustrated in FIG. 2. In FIG. 2, a round robin arbiter 200 statically selects a command from one of submission queues $112_1$ through $112_n$ based on a round robin selection algorithm regardless of device state, the status of the corresponding completion queues, or any other information. Round robin selection involves selecting from each queue $112_1$ through $112_n$ in order from 1 to n and continually repeating the selection in the same order. Round robin arbiter 200 instructs command fetching logic 202 to select each command Command fetching logic 202 provides the command to command processing logic (not shown in FIG. 2), which processes the command. While round robin selection can ensure equal serving of submission queues, storage device resources may not be optimally utilized, especially when commands from the submission queues are fetched but cannot be processed due to storage device resource constraints. For example, if a write command is fetched from a submission queue and the nonvolatile storage device is unable to process the write command, then the storage device may wait until resources are available to process the write command. If the storage device processing resources for processing a read command were available but not used during the wait period, then such resources are not being efficiently utilized.

Figure 3:
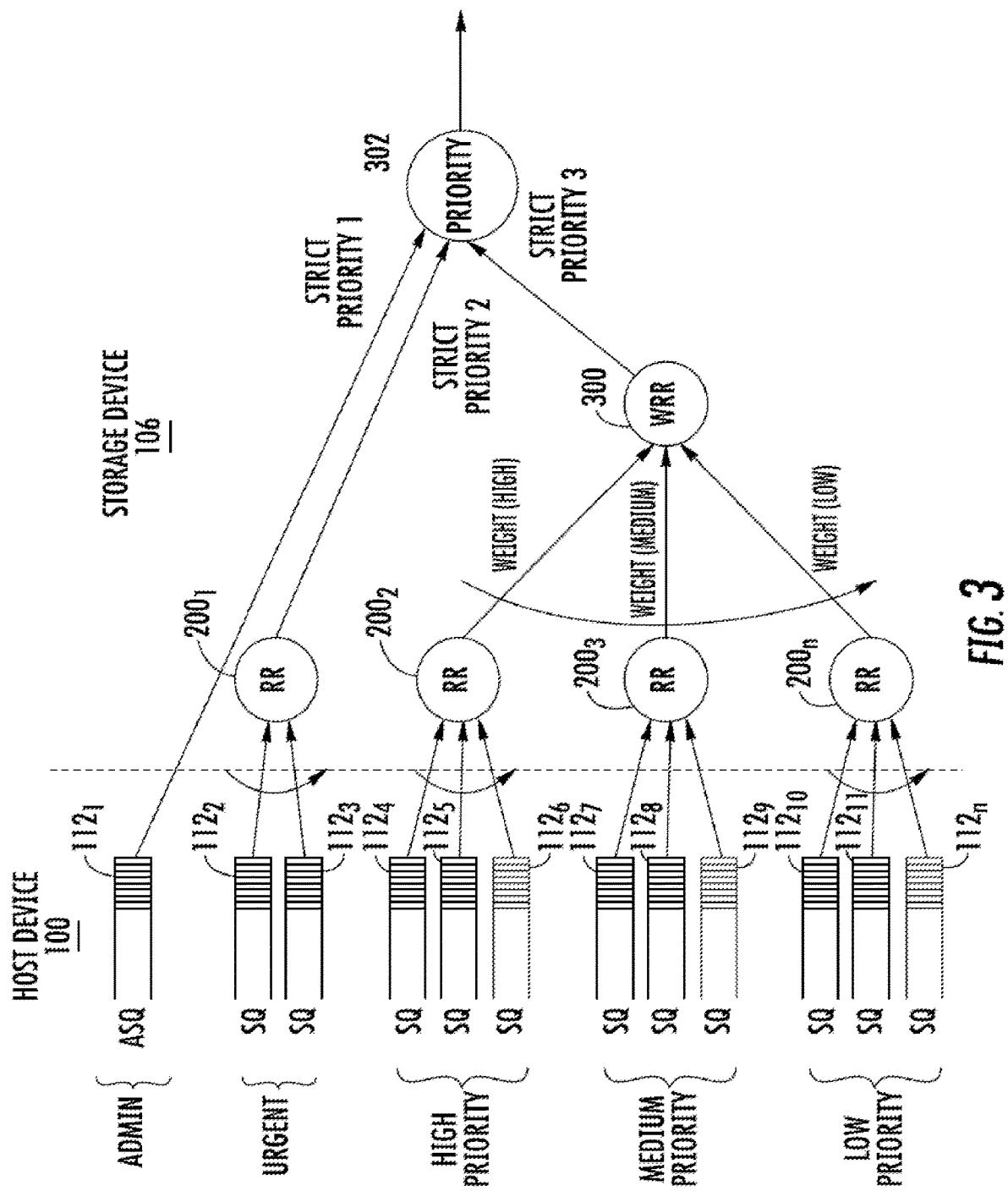
FIG. 3 is a block diagram illustrating weighted round robin command scheduling according to the NVMe standard.

Another mechanism for statically selecting commands from submission queues is illustrated in FIG. 3. In FIG. 3, weighted round robin selection is illustrated. Submission queues $112_1$ through $112_n$ are grouped according to priorities. Round-robin arbiters $200_1$ through $200_m$ each implement round robin selection for their respective queues and pass the selected queue to the next level in the hierarchy. A weighted round robin arbiter 300 selects commands from the candidates selected by round robin arbiters $200_2$, $200_3$, and $200_m$ at the previous level using assigned weights to order the candidates in each round of round robin selection. Weighted round robin arbiter 300 passes its selected queue as a selection candidate to the next level in the hierarchy, which is the highest level. A priority arbiter 302 at the highest level in the hierarchy selects from the output of arbiter 300, admin queue $112_1$, and the output of arbiter 200, using host assigned priorities. While the mechanism illustrated in FIG. 3 allows for prioritization of commands, the priorities are statically set by the host and do not consider submission queue command statistics or nonvolatile storage device resource state. As a result, commands that cannot be immediately processed may be fetched while other commands that could be immediately processed remain enqueued in the submission queues.

Command Fetching Using Submission Queue Statistics

Figure 4:
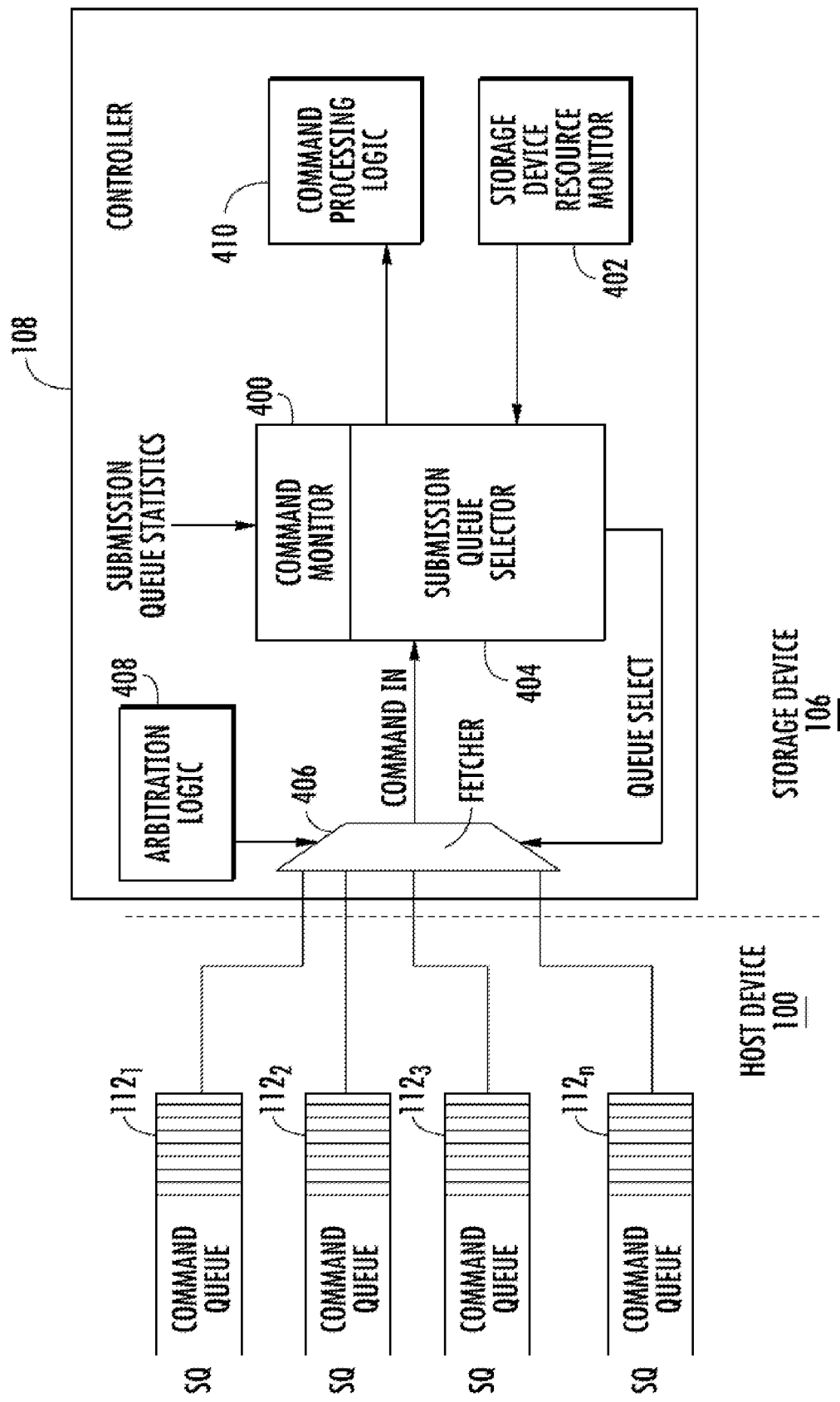
FIG. 4 is a block diagram illustrating a system for intelligent submission queue command fetching according to an embodiment of the subject matter described herein.

FIG. 4 is a block diagram illustrating intelligent fetching of commands from submission queues according to an embodiment of the subject matter described herein. In FIG. 4, device controller 108 includes a command monitor 400 that collects submission queue statistics and a storage device resource monitor 402 that monitors storage device resource state. Examples of submission queue statistics that may be collected are illustrated in FIG. 5. In FIG. 5, the submission queue statistics include, for each submission queue, the number of pending commands, the number of commands fetched from the queue, the number of read commands fetched from the queue, the ratio of read commands to write commands fetched from the queue, the average command size, the smallest command size, and the largest command size.

Statistics such as those illustrated in FIG. 5 may be used to determine the type of commands that are likely to come from a particular submission queue, given statistics on commands that have historically been fetched from the submission queue. For example, it may be determined that a particular submission queue historically contains read commands 90% of the time or write commands 90% of the time and thus the submission queue is likely to contain read or write commands in the future. In another example, the statistics may be used to determine that a particular queue historically contains a majority of random I/O commands or a majority of sequential I/O commands and thus is likely to contain a majority of random or sequential I/O commands in the future. In yet another example, the statistics may indicate commands of a particular size are historically present in a given queue, where the size of the commands refers to the amount of data written or read by a particular command. This command size information may be used by device controller 108 to predict that the next command from a particular submission queue is likely to be of a certain size or within a certain size range.

Information about the commands can be learned by device controller 108 as commands are fetched from the submission queues by reading the values of predetermined fields in the command structure. FIG. 6 illustrates an exemplary structure for an NVMe command In FIG. 6, the opcode field specifies the type of command to be executed, i.e., read, write or admin. In the NVMe standard, a read command has opcode h1 and a write command has opcode h2. Other information that may be useful to device controller 108 in intelligent command fetching includes the size of the command, which is specified by the number of logical blocks (NLB) field in the opcode of the command. Thus, device controller 108 may read the NLB value in commands that it fetches to determine command size.

Information such as that illustrated in FIG. 5 can be used in combination with storage device resource state information to intelligently fetch commands. Returning to FIG. 4, submission queue selector 404 receives input from command monitor 400 regarding submission queue statistics and input from storage device resource monitor 402 regarding storage device resource state. Examples of storage device resource state information include the status of a read or write pipeline in the storage device, i.e., whether the pipeline is currently available to receive additional read or write commands. The terms "read pipeline" and "write pipeline" refer to components of nonvolatile storage device 106 respectively associated with reading data from and writing data to nonvolatile memory 109. Such components may include queues and circuitry internal to device controller 108, external to device controller 108, internal to nonvolatile memory 109, and/or external to nonvolatile memory 109. Submission queue selector 404 may utilize the submission queue statistics and the storage device resource state to identify one of submission queues $112_1$-$112_n$ from which the next command to be processed is selected and provide input to fetcher 406 that identifies the selected queue. Fetcher 406 receives the selection input from submission queue selector 404 and may also receive input from arbitration logic 408. Arbitration logic 408 may implement round robin, weighted round robin, or other selection algorithm as described above. In one example, the intelligent selection from submission queue selector 404 may override round robin or weighted round robin selection provided by arbitration logic 408. In another example, the selection input from command submission queue selector 404 may mask a particular queue from the current round of round robin or weighted round robin selection so that the queue is not included or passed over in the current round of round robin or weighted round robin selection.

One specific example of intelligent command fetching may be that the command monitor 400 determines that submission queue $112_1$ has historically contained mostly read commands and submission queue $112_2$ has historically contained mostly write commands Storage device resource monitor 402 may determine that the storage device is currently incapable of processing write commands because the internal write pipeline is full, but the read pipeline is capable of processing read commands In such a case, submission queue selector 404 will select submission queue $112_1$ as the submission queue from which the next command will be selected, which, based on the statistics is likely to be a read command. A similar selection may be performed from submission queue $112_2$ if it is determined that the read pipeline is full but that the write pipeline is available.

In another example, it may be desirable to select a number of random writes to fill a page of storage device memory with random writes. In such an example, command monitor 400 may determine that one of submission queues $112_1$ through $112_n$ has historically contained mostly random writes of small size, such as 4 kilobytes. Submission queue selector 404 may then fetch enough random writes from the identified queue to fill a page and may select a number of random writes from that queue to fill the page.

Figure 7A:
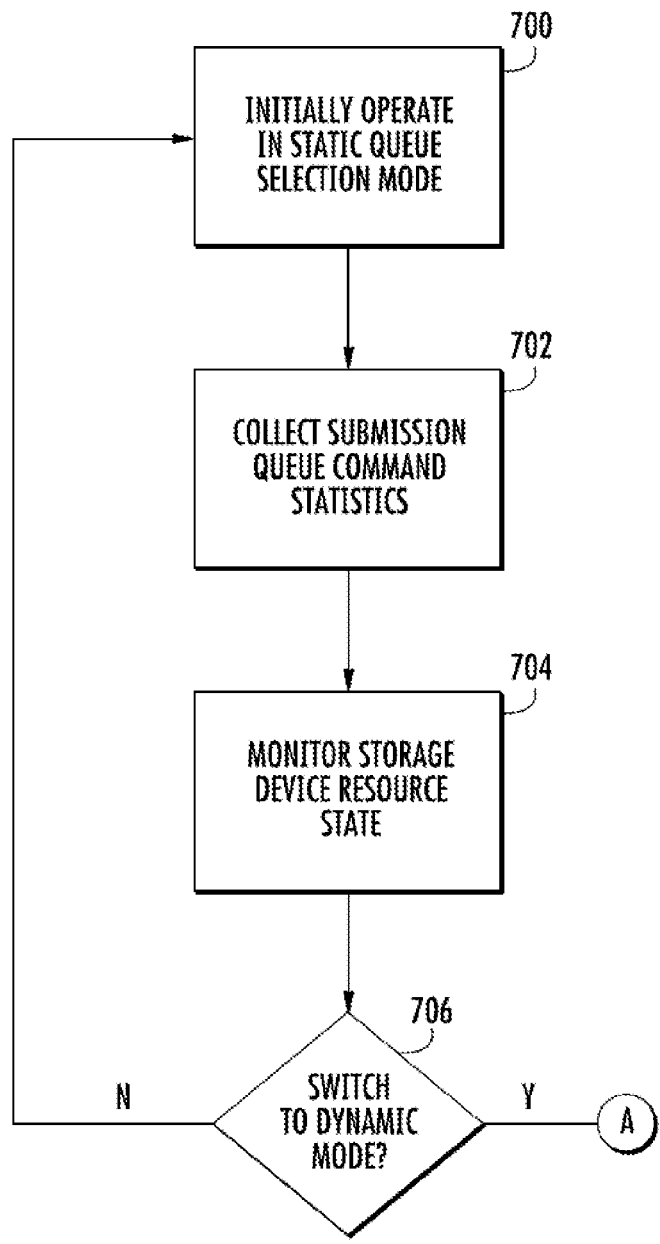
FIGS. 7A and 7B are flow charts illustrating a process for intelligent submission queue command fetching according to an embodiment of the subject matter described herein.
Figure 7B:
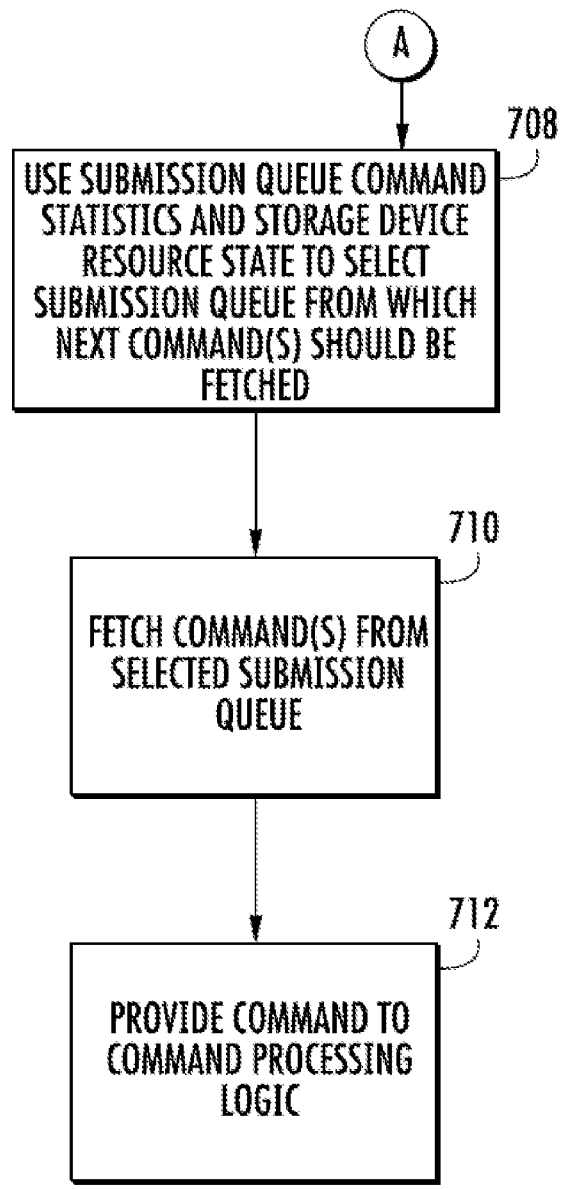

FIGS. 7A and 7B illustrate intelligent submission queue command fetching according to an embodiment of the subject matter described herein. Referring to FIG. 7A, in step 700, the storage device may initially operate in a static submission queue selection mode. Static submission queue selection mode may be round robin, weighted round robin or any other mode specified by the NVMe or other protocol where commands are fetched from submission queues in a static order. In steps 702 and 704, the device collects submission queue command statistics and monitors storage device resource state. Steps 702 and 704 may be performed continually, whether static command fetching, dynamic command fetching, or a combination of static and dynamic command fetching is being implemented. In step 706, it is determined whether to switch to dynamic mode. Switching to dynamic mode may be implemented, for example, when storage device resource state information indicates that one or more storage device resources are over- or under-utilized. In another example, dynamic mode may be implemented continually and step 706 may be omitted.

Referring to FIG. 7B, once the storage device is in dynamic submission queue selection mode, control proceeds to step 708 where the storage device uses submission queue command statistics and storage device resource state to select the submission queue from which the next command or commands should be fetched. This step may be performed by device controller 108 using the statistics collected by command monitor 400 and the storage device resource state information collected by storage device resource monitor 402. In step 710, the command is fetched from the selected submission queue. For example, submission queue selector 404 may provide a selection input to fetcher 406 which fetches the command from the identified submission queue. In step 712, the command is provided to command processing logic 410. For example, submission queue selector 404 may provide the command to command processing logic 410. Command processing logic 410 may process the command, which may be a memory read, a memory write, or an admin command, and perform the selected operation on the nonvolatile memory device 106. Command processing logic 410 or a separate process may write an entry to a completion queue indicating completion of command and an indication of whether the command was completed with or without error.

Device controller 108 may operate in dynamic submission queue selection mode as long as there is a constraint or limitation on available storage device resources. If the constraint or limitation is removed, device controller 108 may switch back into static submission queue selection mode. Thus, device controller 108 may control the switching of storage device 106 between static and dynamic submission queue selection modes depending on device resource state.

Intelligent memory device command fetching according to the subject matter described herein improves utilization of nonvolatile storage devices by selecting or fetching commands from submission queues when storage device resources are available to process the commands Such intelligent fetching also improves host utilization of a nonvolatile storage device because the nonvolatile storage device may process commands from the host faster than in implementations where round robin or weighted round robin command fetching only is used. It should also be noted that any of the intelligent command fetching methods or systems described herein may be used in combination with round robin, weighted round robin selection, or other host-defined command fetching algorithm without departing from the scope of the subject matter described herein.

The subject matter described herein can be implemented in any suitable NAND flash memory, including 2D or 3D NAND flash memory. Semiconductor memory devices include volatile memory devices, such as dynamic random access memory ("DRAM") or static random access memory ("SRAM") devices, nonvolatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that the subject matter described herein is not limited to the two dimensional and three dimensional exemplary structures described but cover all relevant memory structures within the spirit and scope of the subject matter as described herein and as understood by one of skill in the art.

It will be understood that various details of the presently disclosed subject matter may be changed without departing from the scope of the presently disclosed subject matter. Furthermore, the foregoing description is for the purpose of illustration only, and not for the purpose of limitation.

Command Fetching Using Command Prediction

Aspects of the approaches described above involve collecting statistical information about the latest fetched commands with respect to their corresponding submission queues (SQs) on the host. The statistical information may then be used by the arbitration logic to identify a candidate queue from the multiple submission queues on the host that best corresponds with the device requirements. In such case, the next command may be fetched from that queue based on feedback from the device rather than based on a queue arbitrary priority, thereby optimizing the overall system performance. However, there are several drawbacks for this method that are addressed in a new solution. More specifically, the approaches described above may not provide sufficient performance for predicting commands.

Figure 8:
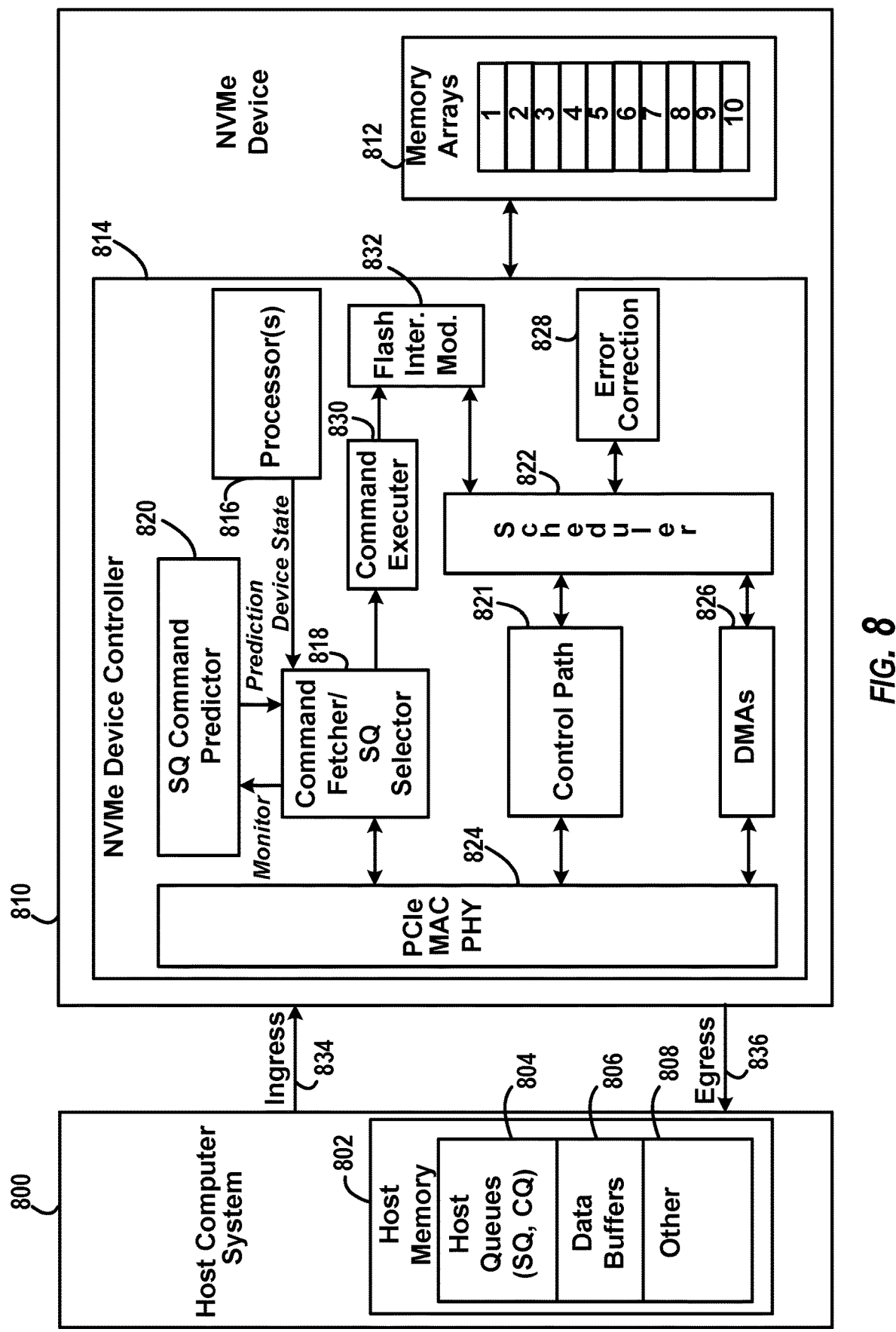
FIG. 8 is a block diagram illustrating a system for intelligent submission queue command fetching using command prediction according to an embodiment of the subject matter described herein.
Figure 9:
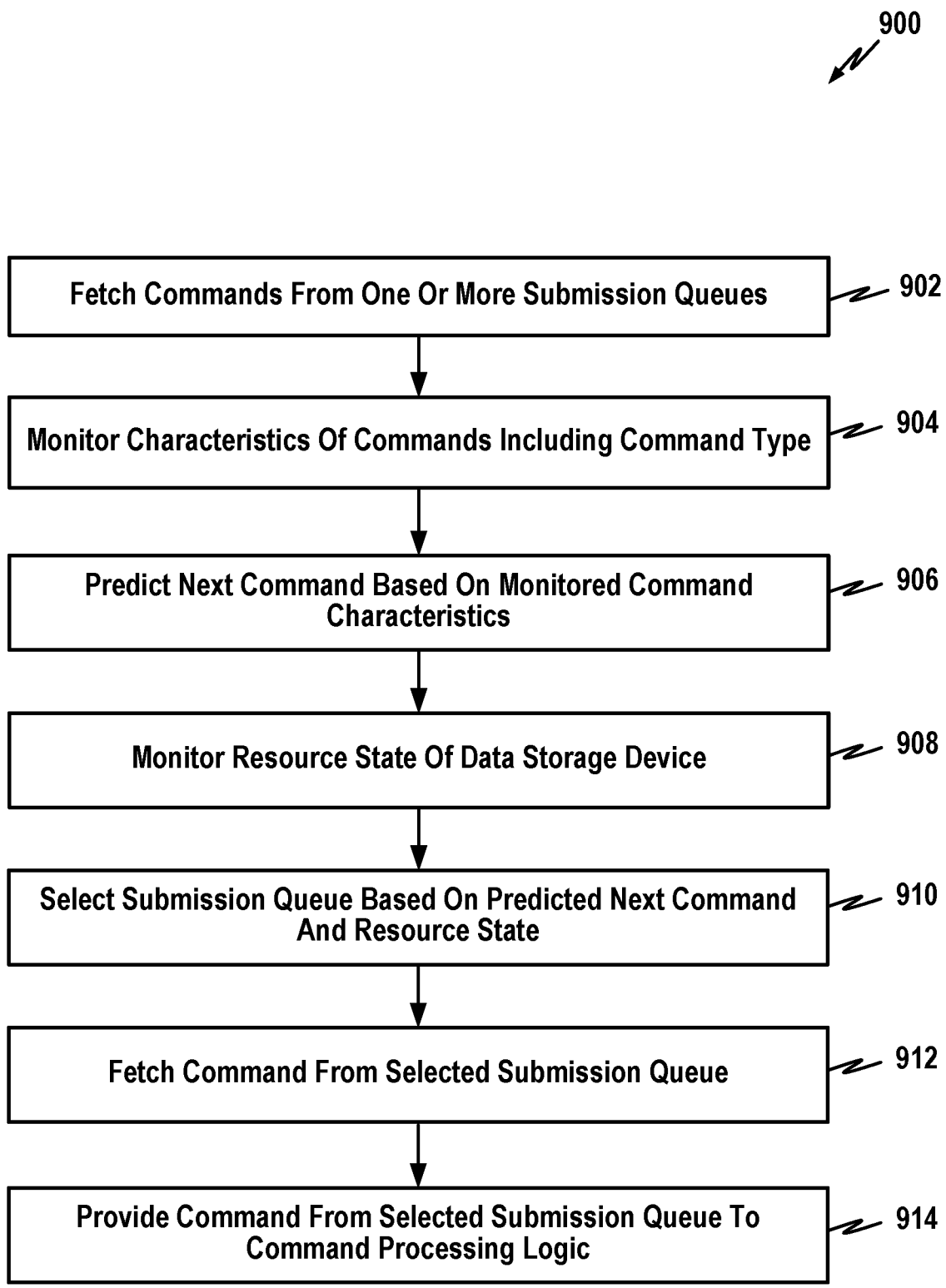
FIG. 9 is a flow chart illustrating a process for intelligent submission queue command fetching using command prediction according to an embodiment of the subject matter described herein.
Figure 10:
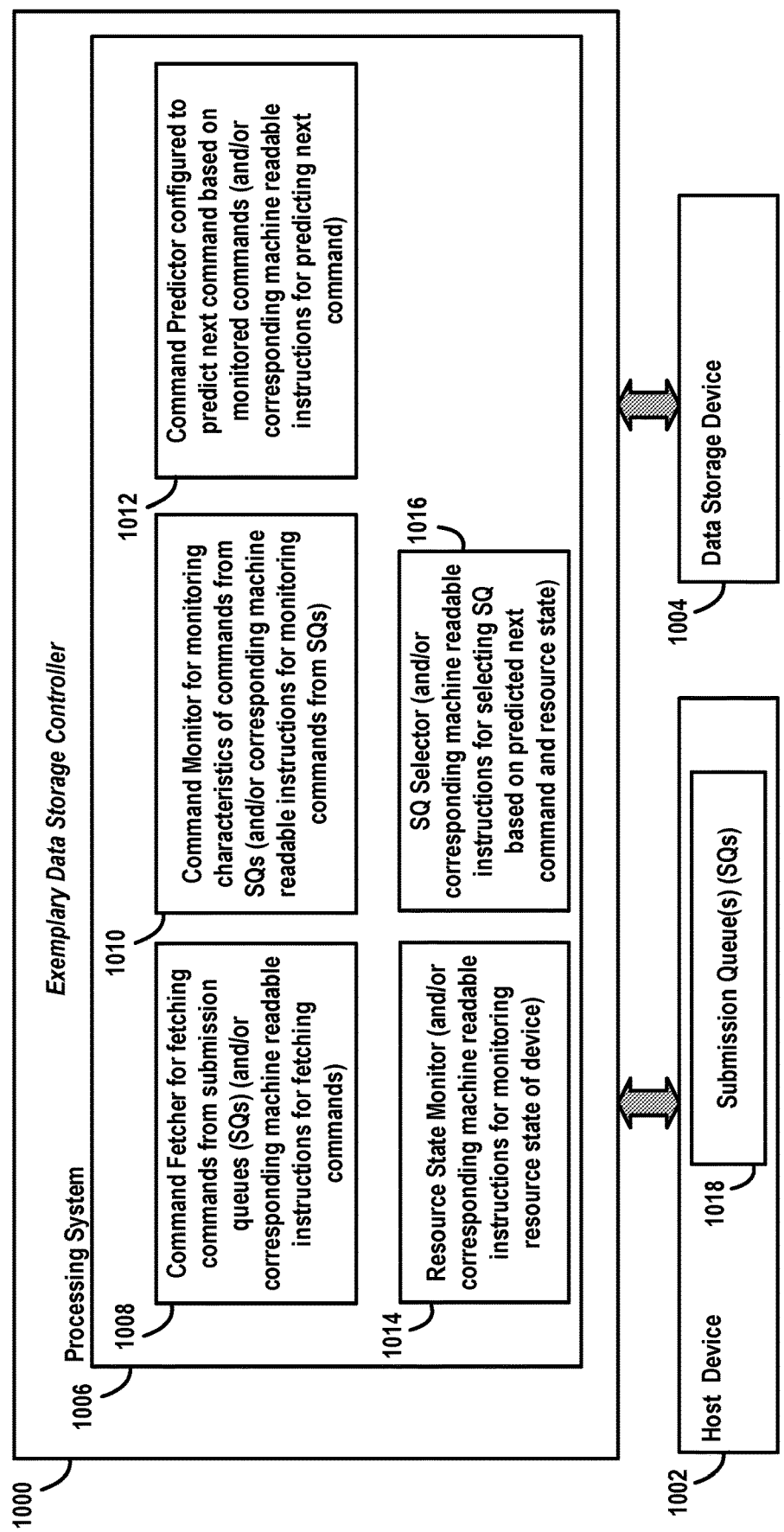
FIG. 10 is a block diagram summarizing selected features of a data storage controller equipped for intelligent submission queue command fetching using command prediction according to an embodiment of the subject matter described herein.

Referring now to FIGS. 8-10, systems and methods for performing intelligent submission queue command fetching using command prediction are illustrated. One such method involves fetching commands from one or more submission queues, monitoring characteristics of the commands including a command type, predicting a next command based on the monitored command characteristics, monitoring a resource state of a data storage device, selecting a submission queue based on the predicted next command and the resource state, fetching a command from the selected submission queue, and providing the command from the selected submission queue to command processing logic.

Note that aspects of the approaches described herein for command prediction, and those described above for command fetching using submission queue statistics, may be implemented using a vendor specific algorithm option defined in the NVMe specification. More specifically, a vendor may choose to implement a vendor specific arbitration mechanism. The mechanism(s) are outside the scope of the NVMe specification.

FIG. 8 is a block diagram illustrating a system for intelligent submission queue command fetching using command prediction according to an embodiment of the subject matter described herein. In one aspect, the system is an exemplary NVMe system. In FIG. 8, a host computer system 800 includes host memory 802, which includes host queues 804 (such as the aforementioned SQs and CQs), data buffers 806, and other memory components 808. An NVMe device 810 includes memory arrays 812 and an NVMe device controller 814. The NVMe controller 814 includes one or more processors 816, a command fetcher/SQ selector 818, a SQ command predictor 820, and various additional components (to be discussed below).

At least one of the processors 816 may be equipped to provide a device state to a command fetcher/SQ selector 818. The processors are also responsible for the execution of Frond-End and Back-End tasks.

The command fetcher/SQ selector 818 is configured to fetch commands from the submission queues (SQs) at the host 800. The command fetcher/SQ selector 818 will be discussed further below. In one aspect, the command fetcher/SQ selector 818 is similar to the SQ selector 404 of FIG. 4.

The SQ command predictor 820 is configured to monitor commands being processed/fetched by the command fetcher/SQ selector 818. The SQ command predictor 820 can monitor the incoming commands, including a number of characteristics such as command type (e.g., read command or write command), command size, and/or logical block address (LBA) range. Additional characteristics monitored can include a write stream identifier, a force unit access characteristic, a dataset management characteristic, an end to end protection characteristic, and/or an association with dies of the data storage device characteristic. As to the write stream identifier, this characteristic may refer to a set of common stream parameters. As to the force unit access characteristic, this characteristic may define when the device 810 is allowed to send a completion notice to host 800. As to the association with dies (of the data storage device) characteristic, this characteristic may define which die is to be the target of the command. As to the dataset management characteristic, this characteristic may refer to attributes for the LBA(s) being read or written (e.g., access latency, access frequency, and/or sequential hints). As to the end to end protection characteristic, this characteristic may refer to the protection information structure and action and is defined in the NVMe standard.

Based on the information collected by monitoring the fetched commands, and possibly some algorithm training, the SQ command predictor 820 is configured to predict the next command that a particular SQ of the group of SQs 804 will likely have available for fetching. In one aspect, the prediction may be achieved using one or more machine learning algorithms Examples of suitable machine learning algorithms include a logistic regression algorithm, a support vector machine algorithm, a mixture model algorithm, a Hidden Markov Model algorithm, and/or a neural network algorithm. A brief discussion of each of these machine learning algorithms may be helpful.

Logistic Regression Algorithm

In one aspect, the logistic regression algorithm may be thought of as a statistical method for analyzing a dataset in which there are one or more independent variables that determine an outcome. The outcome is measured with a dichotomous variable (in which there are only two possible outcomes). This may suit the command prediction approaches described herein if it is used only in a dichotomous fashion, to discern whether the next command is read or write. However, it offers less flexibility if we want to generate more outputs (e.g., outputs other than command type such as LBA range).

Support Vector Machine (SVM) Algorithm

In one aspect, the support vector machine algorithm may be thought of as follows. Given a set of training examples, each marked as belonging to one of several categories, an SVM training algorithm may build a model that assigns new examples to one category or the other, making it a non-probabilistic binary linear classifier. A SVM model may be a representation of the examples as points in space, mapped so that the examples of the separate categories are divided by a clear gap that may be as wide as possible. New examples are then mapped into that same space and predicted to belong to a category based on which side of the gap they fall. This may suit the command prediction approaches described herein if it is used only in a dichotomous fashion, to discern whether the next command is read or write. However, it offers less flexibility if we want to generate more outputs (e.g., outputs other than command type such as LBA range).

Mixture Model (MoG) Algorithm

In one aspect, the mixture model (e.g., mixture of gaussian models or MoG) algorithm may be thought of as a probabilistic model for representing the presence of subpopulations within an overall population, without requiring that an observed data set should identify the sub-population to which an individual observation belongs. Formally a mixture model corresponds to the mixture distribution that represents the probability distribution of observations in the overall population. However, while problems associated with "mixture distributions" relate to deriving the properties of the overall population from those of the sub-populations, "mixture models" are used to make statistical inferences about the properties of the sub-populations given only observations on the pooled population, without sub-population identity information.

Hidden Markov Model (HMM) Algorithm

In one aspect, the Hidden Markov Model (HMM) algorithm may be thought of as a statistical Markov model in which the system being modeled is assumed to be a Markov process with unobserved (i.e., hidden) states. A hidden Markov model can be considered a generalization of a mixture model (explained above) where the hidden variables, which control the mixture component to be selected for each observation, are related through a Markov process rather than independent of each other. Recently, hidden Markov models have been generalized to pairwise Markov models and triplet Markov models which allow consideration of more complex data structures and the modeling of nonstationary data. A Markov process is a process that satisfies the Markov property if one can make predictions for the future of the process based solely on its present state just as well as one could knowing the process's full history, hence independently from such history (e.g., conditional on the present state of the system, where its future and past states are independent).

Neural Network (NN) Algorithm

In one aspect, the neural network (NN) algorithm (or machine learning algorithm) may be thought of as an algorithm that gives a computer an ability to learn with data, but without being specifically programmed In one aspect, neural networks can also be thought of as a set of algorithms that are designed to recognize patterns. They can interpret sensory data through a kind of machine perception, labeling or clustering raw input.

The descriptions above provide examples of these various algorithms. In one aspect, industry definitions of these algorithms (to the extent that the above descriptions diverge) may be used as well.

Returning now to FIG. 8, in one aspect, the SQ command predictor 820 may implement/employ a machine learning algorithm per host submission queue (SQ) and based on that, the logic predicts the next host 802 command that is going to be fetched from each submission queue 804. Using this information along with the current state of the device provided by the processors 816, an intelligent command fetching algorithm may be implemented at the command fetcher/SQ selector 818. As an embodiment to relevant systematic solution disclosed herein, either classification machine learning algorithms, or regression algorithms could be used, as are discussed above. These algorithms may be trained based on historic host command information that were previously queued in a particular SQ, according to various command parameters/characteristics, such as those that are described above.

In one aspect, the machine learning algorithm can detect patterns and/or command sequences, and not only based on an average. For example, the algorithm may detect the following pattern: 9 reads, 2 writes, 9 reads, 2 writes . . . . Based on this pattern, the algorithm could predict the next command to be 9 reads and then 2 writes.

In one aspect, the outputs of the SQ command predictor 820, and underlying machine learning algorithm, can include a next host command type queued in a particular SQ and/or attributes/characteristics of the next host command (e.g., command size, associated NAND dies, etc.). In one aspect, the command attributes/characteristics can be one or more of those described above, or any other similar command characteristics known in the art.

In one aspect, the prediction of these parameters could be targeted to both exact values (e.g., using a regression model), or to one of several pre-defined clusters (e.g., using a classification model).

In one aspect, the training procedure (for a model parameter configuration as well as for model choosing) could be done off-line (e.g., before the NVMe device 810 is released by a manufacturer to a customer, and be adjusted in-field (on-line, e.g., after the NVMe device 810 is released by a manufacturer to a customer) by each device controller according to specific user and SQ behaviors.

In another aspect, instead of training a machine learning algorithm/model to predict the time/die for the next command (and possibly add optimization of decision making rules), the system could include a performance gain objective function targeted directly to calibrate the model's parameters to maximize the performance gain. In one aspect, this concept may be related to reinforcement learning, such as when a sequential procedure is optimized according to occasional rewards (e.g., of occasional performance boosting scenarios).

Returning now to the discussion of the command fetcher/SQ selector 818, it may receive the prediction information generate by the SQ command predictor 820 along with the device state information from the processors 816. Examples of device state information can include a state of device caches (e.g., a write cache or a read cache), the current operational state of the device (e.g., working on garbage collection, working on a burst read, or the like). Other examples of device state information can include the status of a read or write pipeline in the storage device, i.e., whether the pipeline is currently available to receive additional read or write commands. The terms "read pipeline" and "write pipeline" refer to components of nonvolatile storage device 106 respectively associated with reading data from and writing data to nonvolatile memory 109.

Based on the predicted next command, and/or the command attributes, and the device state, the command fetcher/SQ selector 818 can select a SQ most likely or predicted to have a next command that may be helpful for the device. For example, if the device 810 would perform most efficiently with a read command, and the SQ command predictor 820 predicts the next command to be a write command, the command fetcher/SQ selector 818 may select from a different SQ than the current SQ, or even select from a SQ likely/predicted to have a read command as its next command. Similarly, if the device 810 would perform most efficiently with a write command, and the SQ command predictor 820 predicts the next command to be a read command, the command fetcher/SQ selector 818 may select from a different SQ than the current SQ, or even select from a SQ likely/predicted to have a write command as its next command. For greater efficiency and sophistication, the command fetcher/SQ selector 818 can take into account additional predicted command attributes other than command type.

Command Prediction Use Cases

To facilitate further understanding of the NVMe device controller 814 with command prediction, it is helpful to consider a few use cases. In one use case, consider the operation of the NVMe device controller 814 with command prediction with a write cache located in the NVMe device 810/812 (e.g., together or apart from the controller 814). In some scenarios, it may be better for the device to fetch a write command. For example, in one aspect, the execution of this write command may fully populate a partially populated write cache buffer. This may trigger the device (e.g., NAND) program operation to empty the temporal buffers that hold the write cache data for other purposes. In one aspect, this feature applied to the write cache allows for better internal temporal buffer management. As one example of how this might be implemented, the command fetcher/SQ selector 818, possibly in conjunction with processor(s) 816 or other components of the controller 814 and memory arrays 812, may be configured to select a submission queue having a next command that is most likely (or predicted to be) a write command having a preselected size, and then execute the write command, where a partially full write cache becomes full upon the execution of the write command, thereby causing the data storage device to empty the write cache.

For a second use case, consider the operation of the NVMe device controller 814 with command prediction with garbage collection and relocation being performed in the NVMe device 810/812 (e.g., together or apart from the controller 814). In one aspect, a "hole" in relocation (e.g., caused by the garbage collection and relocation functions being performed) may be filled with new write data (e.g., by selecting a SQ most likely (or predicted) to have a write command with a size sufficient to fill the "hole"). As one example of how this might be implemented, the command fetcher/SQ selector 818, possibly in conjunction with processor(s) 816 or other components of the controller 814 and memory arrays 812, may be configured to select a submission queue having a next command that is most likely (or predicted to be) a write command including write data, and then execute the write command such that the write data is stored to a memory location that represents a hole in a group of data (e.g., block) relocated for garbage collection, thereby filling the hole.

For a third use case, consider the operation of the NVMe device controller 814 with command prediction with a burst operation (e.g., burst read) being performed in the NVMe device 810/812 (e.g., apart from the controller 814). In some scenarios, it is better for the device to fetch a read command since the NAND interface is busy with a burst operation. In such case, in order to increase the performance, it may be better to bind this read request with the burst operation. As one example of how this might be implemented, the command fetcher/SQ selector 818, possibly in conjunction with processor(s) 816 or other components of the controller 814 and memory arrays 812, may be configured to select a submission queue having a next command that is most likely (or predicted to be) a read command, and then execute the read command as part of a burst read at the data storage device. In one aspect, the burst read is performed by both the controller 814 and device 812 where the controller is the master and the device/NAND is the slave. In such case, the controller 814 may initiate the burst read and decide when to terminate it.

In each of the use cases described above, a command may be fetched according to the command type and/or another command attribute (e.g., command size)

In one aspect, the device may not be busy (e.g., non-busy). In such case, the command fetcher/SQ selector 818, possibly in conjunction with processor(s) 816 or other components of the controller 814 and memory arrays 812, may be configured to select, if the resource state is indicative of a non-busy state, the submission queue using one of the conventional NVMe algorithms discussed above, such as the round robin algorithm or the weighted round robin algorithm.

As to the various additional components of the NVMe controller 814, they include a control path module 821, a scheduler 822, a PCIe MAC PHY interface 824, DMAs 826, error correction module 828, a command executer module 830 and a flash interface module 832. In operation, the control path module 821 may be responsible for managing the host completion queues. Among other functions, the control path module 821 routes completion entries received from a scheduler 821 to a completion queue (CQ) within the host device 800 via a PCIe MAC PHY interface 824.

Actual pages of data to be delivered to the host device (such as the result of read commands) are delivered using one or more DMAs 826. Additional components of the NVMe controller 814 shown in FIG. 8 include the command executer 830, which is responsible for the arbitrating and executing the commands, the flash interface module 832, which is responsible for controlling and accessing the memory arrays, and the error correction module 828, which is responsible for error correction. Ingress and egress from the NVMe device 810 is illustrated via arrows 834 and 836.

FIG. 9 is a flow chart illustrating a process 900 for intelligent submission queue command fetching using command prediction according to an embodiment of the subject matter described herein. In one aspect, process 900 may be performed by one or more of the components of the NVMe controller 814 of FIG. 8, including the processors 816, the command fetcher/SQ selector 818, and/or the SQ command predictor 820.

In block 902, the process fetches commands from one or more submission queues. In one aspect, the command fetcher/SQ selector 818 of FIG. 8 performs this action by fetching one or more commands from one of more submission queues (e.g., any of SQs $112_1$ to $112_n$ in FIG. 2).

In block 904, the process monitors characteristics of the commands including a command type. In one aspect, the SQ command predictor 820 of FIG. 8 may perform this action. Command types and other attributes/characteristics, such as command size, are described above.

In block 906, the process predicts a next command based on the monitored command characteristics. In one aspect, the SQ command predictor 820 of FIG. 8 may perform this action. In one aspect, the SQ command predictor 820 may employ a machine learning algorithm to generate the predicted command. The machine learning algorithms are described in detail above. In one aspect, the process predicts a command type and/or other command characteristics/attributes (e.g., command size, LBA range, etc.). In one aspect, the process predicts, for each of the one or more submission queues, the next command based on the monitored command characteristics for the respective submission queue. In one aspect, the process predicts, for each of the one or more submission queues, the next command based on the monitored command characteristics for the respective submission queue and at least one other submission queue. In one aspect, the prediction for a particular submission queue may be based on other submission queues.

In block 908, the process monitors a resource state of a data storage device. In one aspect, the processor(s) 816 of FIG. 8 may perform this action. In one aspect, the resource state may be indicative of a non-busy state, a read seeking state, or a write seeking state. In such case, for the read seeking state, the device can be most efficiently helped by fetching a read command, possibly having a particular size or other attribute. In such case, for the write seeking state, the device can be most efficiently helped by fetching a write command, possibly having a particular size or other attribute.

In block 910, the process selects a submission queue based on the predicted next command and the resource state. In one aspect, the command fetcher/SQ selector 818 and/or the processor(s) 816 of FIG. 8 may perform this action. In one aspect, the process can select the SQ having a next command that is most likely (or predicted to be) a write command with a preselected size to fill a partially full write cache upon the execution of the write command, thereby causing the data storage device to empty the write cache. In one aspect, the process can select the SQ having a next command that is most likely (or predicted to be) a write command to help with garbage collection whereby the process executes the write command such that the write data is stored to a memory location that represents a hole in a group of data relocated for garbage collection, thereby filling the hole. In one aspect, the process selects the SQ having a next command that is most likely (or predicted to be) a read command to assist a burst read in the device. In such case, the process can execute the read command as part of the burst read at the data storage device.

In block 912, the process fetches a command from the selected submission queue. In one aspect, the command fetcher/SQ selector 818 and/or the processor(s) 816 of FIG. 8 may perform this action.

In block 914, the process provides the command from the selected submission queue to command processing logic. In one aspect, the command fetcher/SQ selector 818, the command executer 830, and/or the processor(s) 816 of FIG. 8 may perform this action. In one aspect, the command processing logic includes the command executer 830 and/or the processor(s) 816 of FIG. 8.

In one aspect, the process can perform the sequence of actions in a different order. In another aspect, the process can skip one or more of the actions. In other aspects, one or more of the actions are performed simultaneously. In some aspects, additional actions can be performed. In one aspect, any of the actions of FIG. 9 can be used in conjunction with any of the examples described above.

FIG. 10 is a block diagram summarizing selected features of a data storage controller 1000 equipped for intelligent submission queue command fetching using command prediction according to an embodiment of the subject matter described herein. The data storage controller 1000 may be configured to communicate with a host device 1002 and a data storage device 1004. Although many examples described herein relate to NVMe controllers for storing data within NAND devices, the data storage device 1004 may be any suitable memory or storage device and is not limited to NANDs, and the data storage controller 1000 may be any suitable memory controller device and is not limited to NVMe-based controllers.

The exemplary data storage controller 1000 of FIG. 10 includes a processor 1006 (e.g., processing system/circuitry) for controlling storage, retrieval and/or erasure of data within the memory device 1004 and for SQ command fetching using command prediction or the like from the host device 1002. The exemplary processor 1006 includes a command fetcher component or controller 1008 configured to fetch commands from SQs 1018 in the host device 1002 based on predicted commands. The processor 1006 also includes a command monitor 1010 configured to monitor commands fetched from SQs 1018.

The processor 1006 further includes a command predictor 1012 configured to predict a next command based on the monitored commands fetched from the SQs 1018, using techniques described above or other command prediction techniques. The processor 1006 further includes a resource state monitor 1014 configured to monitor a resource state of the device (e.g., data storage device). The processor 1006 further includes a SQ selector 1016 configured to select a SQ based on a predicted next command and device resource state.

In at least some examples, means may be provided for performing the functions illustrated in FIG. 10 and/or other functions illustrated (such as those illustrated in FIG. 9) or described herein. For example, an apparatus (e.g. processing system 1006) may be provided for use with a data storage device (e.g. storage device 1004) where the apparatus includes: means (such as command fetcher 1008 or command fetcher 818 of FIG. 8) for fetching commands from one or more submission queues; means (such as the command monitor 1010 or SQ command predictor 820 of FIG. 8) for monitoring characteristics of the commands including a command type; means (such as command predictor 1012 or SQ command predictor 820 of FIG. 8) for predicting a next command based on the monitored command characteristics; means (such as resource state monitor 1014 or processors 816 of FIG. 8) for monitoring a resource state of a data storage device; means (such as SQ selector 1016 or command fetcher/SQ selector 818 of FIG. 8) for selecting a submission queue based on the predicted next command and the resource state; means (such as command fetcher 1008 or command fetcher 818 of FIG. 8) for fetching a command from the selected submission queue; and means (such as processor 1006 or command executer 830 of FIG. 8) for providing the command from the selected submission queue to command processing logic. In one aspect, means for performing some of these functions may also be found in FIG. 4.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

In at least some examples, a machine-readable storage medium may be provided having one or more instructions which when executed by a processing circuit causes the processing circuit to perform the functions illustrated in FIG. 10 and/or other functions illustrated or described herein. For example, instructions may be provided for: fetching commands from one or more submission queues; monitoring characteristics of the commands including a command type; predicting a next command based on the monitored command characteristics; monitoring a resource state of a data storage device; selecting a submission queue based on the predicted next command and the resource state; fetching a command from the selected submission queue; and providing the command from the selected submission queue to command processing logic. These instructions can include additional instructions for performing any of the actions described above in conjunction with FIG. 9, and FIG. 8.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner Tasks or events may be added to or removed from the disclosed example embodiments. The example systems and components described herein may be configured differently than described. For example, elements may be added to, removed from, or rearranged compared to the disclosed example embodiments.

What is claimed is:

1. A method for use by a data storage controller, comprising:
    fetching commands from one or more submission queues;
    monitoring characteristics of the commands including a command type;
    predicting, using a machine learning algorithm, a next command based on the monitored command characteristics;
    monitoring a resource state of a data storage device;
    selecting a submission queue based on the predicted next command and the resource state;
    fetching a command from the selected submission queue; and
    providing the command from the selected submission queue to command processing logic.

2. The method of claim 1, wherein the predicting the next command based on the monitored command characteristics comprises predicting a command type of the next command based on the monitored command characteristics.

3. The method of claim 2, wherein the predicting the next command based on the monitored command characteristics further comprises predicting a command attribute of the next command based on the monitored command characteristics.

4. The method of claim 1, wherein the monitored command characteristics further comprise a characteristic selected from the group consisting of a command size, a logical block address (LBA) range, a write stream identifier, a force unit access characteristic, a dataset management characteristic, an end to end protection characteristic, an association with dies of the data storage device characteristic, and combinations thereof.

5. The method of claim 1, wherein the machine learning algorithm comprises an algorithm selected from the group consisting of a logistic regression algorithm, a support vector machine algorithm, a mixture model algorithm, a Hidden Markov Model algorithm, a neural network algorithm, and combinations thereof.

6. The method of claim 1, further comprising training the machine learning algorithm before the data storage device is released to a customer.

7. The method of claim 6, further comprising training the machine learning algorithm after the data storage device is released to the customer.

8. The method of claim 1, wherein the machine learning algorithm is configured to detect a data characteristic selected from the group consisting of a pattern and a command sequence.

9. The method of claim 1, wherein the predicting the next command based on the monitored command characteristics comprises predicting, for each of the one or more submission queues, the next command based on the monitored command characteristics for the respective submission queue.

10. The method of claim 1, wherein the predicting the next command based on the monitored command characteristics comprises predicting, for each of the one or more submission queues, the next command based on the monitored command characteristics for the respective submission queue and at least one other submission queue of the one or more submission queues.

11. The method of claim 1:
wherein the selecting the submission queue based on the predicted next command and the resource state comprises selecting the submission queue having a next command that is predicted to be a write command comprising a preselected size; and
wherein the method further comprises executing the write command, wherein a partially full write cache becomes full upon the execution of the write command, thereby causing the data storage device to empty the write cache.

12. The method of claim 1:
wherein the selecting the submission queue based on the predicted next command and the resource state comprises selecting the submission queue having a next command that is predicted to be a write command and comprising a write data; and
wherein the method further comprises executing the write command such that the write data is stored to a memory location that represents a hole in a group of data relocated for garbage collection, thereby filling the hole.

13. The method of claim 1:
wherein the selecting the submission queue based on the predicted next command and the resource state comprises selecting the submission queue having a next command that is predicted to be a read command; and
wherein the method further comprises executing the read command as part of a burst read at the data storage device.

14. The method of claim 1:
wherein the selecting the submission queue based on the predicted next command and the resource state comprises selecting, if the resource state is indicative of a non-busy state, the submission queue using an algorithm selected from the group consisting of a round robin algorithm and a weighted round robin algorithm.

15. A data storage controller for use with a data storage device, comprising:
a memory;
a processing circuitry coupled to the memory and configured to:
fetch commands from one or more submission queues;
monitor characteristics of the commands including a command type;
predict, using a machine learning algorithm, a next command based on the monitored command characteristics;
monitor a resource state of a data storage device;
select a submission queue based on the predicted next command and the resource state;
fetch a command from the selected submission queue; and
provide the command from the selected submission queue to command processing logic.

16. The data storage controller of claim 15, wherein the processing circuitry is further configured to predict a command type of the next command based on the monitored command characteristics.

17. The data storage controller of claim 16, wherein the processing circuitry is further configured to predict a command attribute of the next command based on the monitored command characteristics.

18. The data storage controller of claim 15, wherein the monitored command characteristics further comprise a characteristic selected from the group consisting of a command size, a logical block address (LBA) range, a write stream identifier, a force unit access characteristic, a dataset management characteristic, an end to end protection characteristic, an association with dies of the data storage device characteristic, and combinations thereof.

19. The data storage controller of claim 15, wherein the machine learning algorithm comprises an algorithm selected from the group consisting of a logistic regression algorithm, a support vector machine algorithm, a mixture model algorithm, a Hidden Markov Model algorithm, a neural network algorithm, and combinations thereof.

20. The data storage controller of claim 15, wherein the processing circuitry is further configured to train the machine learning algorithm before the data storage device is released to a customer.

21. The data storage controller of claim 20, wherein the processing circuitry is further configured to train the machine learning algorithm after the data storage device is released to the customer.

22. The data storage controller of claim 15, wherein the machine learning algorithm is configured to detect a data characteristic selected from the group consisting of a pattern and a command sequence.

23. The data storage controller of claim 15, wherein the processing circuitry is further configured to predict, for each of the one or more submission queues, the next command based on the monitored command characteristics for the respective submission queue.

24. The data storage controller of claim 15, wherein the processing circuitry is further configured to predict, for each of the one or more submission queues, the next command based on the monitored command characteristics for the respective submission queue and at least one other submission queue of the one or more submission queues.

25. The data storage controller of claim 15, wherein the processing circuitry is further configured to:
select the submission queue having a next command that is predicted to be a write command comprising a preselected size; and
execute the write command, wherein a partially full write cache becomes full upon the execution of the write command, thereby causing the data storage device to empty the write cache.

26. The data storage controller of claim 15, wherein the processing circuitry is further configured to:
select the submission queue having a next command that is predicted to be a write command comprising a write data; and execute the write command such that the write data is stored to a memory location that represents a hole in a group of data relocated for garbage collection, thereby filling the hole.

27. The data storage controller of claim 15, wherein the processing circuitry is further configured to:
select the submission queue having a next command that is predicted to be a read command; and
execute the read command as part of a burst read at the data storage device.

28. The data storage controller of claim 15, wherein the processing circuitry is further configured to:
select, if the resource state is indicative of a non-busy state, the submission queue using an algorithm selected from the group consisting of a round robin algorithm and a weighted round robin algorithm.

29. A data storage controller for use with a data storage device, comprising:
means for fetching commands from one or more submission queues;
means for monitoring characteristics of the commands including a command type;
means for predicting, using a machine learning algorithm, a next command based on the monitored command characteristics;
means for monitoring a resource state of a data storage device;
means for selecting a submission queue based on the predicted next command and the resource state;
means for fetching a command from the selected submission queue; and
means for providing the command from the selected submission queue to command processing logic.

30. The data storage controller of claim 29, wherein the means for selecting the submission queue based on the predicted next command and the resource state comprises:
means for selecting, if the resource state is indicative of a non-busy state, the submission queue using an algorithm selected from the group consisting of a round robin algorithm and a weighted round robin algorithm.

31. The data storage controller of claim 29, wherein the machine learning algorithm comprises an algorithm selected from the group consisting of a logistic regression algorithm, a support vector machine algorithm, a mixture model algorithm, a Hidden Markov Model algorithm, a neural network algorithm, and combinations thereof.

* * * * *